United States Patent [19]

Ogiri et al.

[11] Patent Number: 5,508,786

[45] Date of Patent: Apr. 16, 1996

[54] IMAGE FORMING APPARATUS

[75] Inventors: Tadakazu Ogiri; Koichi Yasuda; Hiroki Morishita; Hiroyuki Ueda; Naoyuki Ishida; Shinichi Kotera; Yasuhiko Moriuchi; Shigeki Hayashi, all of Osaka, Japan

[73] Assignee: Mita Industrial Co., Ltd. (a corp. of Japan), Osaka, Japan

[21] Appl. No.: 327,788

[22] Filed: Oct. 20, 1994

[30] Foreign Application Priority Data

Oct. 26, 1993 [JP] Japan .................................. 5-291453

[51] Int. Cl.$^6$ ............................................... G03G 21/00
[52] U.S. Cl. .......................... 355/206; 347/7; 347/140; 358/296
[58] Field of Search .......................... 355/206; 347/43, 347/7, 140, 129, 112; 358/296, 298

[56] References Cited

U.S. PATENT DOCUMENTS

| | | | |
|---|---|---|---|
| 5,021,826 | 6/1991 | Maruta | 355/206 |
| 5,095,331 | 3/1992 | Takano | 355/206 |
| 5,202,769 | 4/1993 | Suzuki | 358/300 |
| 5,204,698 | 4/1993 | LeSueur et al. | 347/140 |

FOREIGN PATENT DOCUMENTS 05-330196  12/1993  Japan .

*Primary Examiner*—Nestor R. Ramirez
*Attorney, Agent, or Firm*—Beveridge, DeGrandi Weilacher & Young

[57] ABSTRACT

If it is desired to display the number of copies which can be outputted corresponding to the defined capacity of a developer which is determined by an image forming apparatus, a document which is thought to have a substantially average black ratio of the respective black ratios of images actually recorded by the image forming apparatus is prepared. The prepared document is set in reading means. An image of the set document is read by reading means. The black ratio of the image of the document is calculated on the basis of an output of the reading means. The number of copies which can be outputted corresponding to the defined capacity of the developer which is determined by the image forming apparatus is calculated on the basis of the calculated black ratio. The calculated number of copies which can be outputted is displayed.

7 Claims, 1 Drawing Sheet

ID_FORMING APPARATUS

IMAGE FORMING APPARATUS

BACKGROUND OF THE INVENTION

1. Field of the Invention

The present invention relates to an image forming apparatus such as a facsimile, a copying machine or a printer.

2. Description of the Prior Art

In a facsimile using an electrophotographic system, the number of copies which can be outputted corresponding to the defined capacity of a developer (the capacity of a developer in a developer cartridge) has been previously set. The number of copies which can be outputted is generally set on the basis of a document having a standard black ratio (for example, 6%). The black ratio is the ratio of the number of black pixels to the total number of pixels per one document.

In practice, however, the black ratio of an image recorded by a facsimile is not necessarily a standard black ratio, thereby to make it difficult to estimate the number of copies which can be outputted. Therefore, it is also difficult to estimate the time when the developer is to be replenished.

SUMMARY OF THE INVENTION

An object of the present invention is to provide an image forming apparatus, which is located in a user, capable of informing the user or a serviceman of the number of copies which can be outputted corresponding to a substantially average black ratio of the respective black ratios of images actually recorded by the image forming apparatus and allowing the user or the serviceman to estimate the time when a developer is to be replenished more accurately.

In an image forming apparatus comprising recording means for recording an image on paper using a developer, the image forming apparatus according to the present invention is characterized by comprising reading means for reading an image of a given document, black ratio calculating means for calculating the black ratio of the image of the document on the basis of an output of the reading means, number-of-copies calculating means for calculating the number of copies which can be outputted corresponding to the defined capacity of the developer which is determined by the image forming apparatus on the basis of the black ratio calculated by the black ratio calculating means, and displaying means for displaying the number of copies which can be outputted which is calculated by the number-of-copies calculating means.

It is preferable that the image of the document read by the reading means is a document image having an average black ratio of the respective black ratios of images formed by the image forming apparatus.

Examples of the black ratio calculating means used include one comprising a first counter for counting the number of data each representing a black pixel on the basis of the output of the reading means, a second counter for counting the number of data each representing a white pixel on the basis of the output of the reading means, and means for dividing the result of the counting by the first counter by the sum of the result of the counting by the first counter and the result of the counting by the second counter to calculate the black ratio.

Examples of the number-of-copies calculating means used include one for calculating the number of copies which can be outputted corresponding to the defined capacity of the developer which is determined by the image forming apparatus on the basis of the number of copies which can be outputted corresponding to a predetermined standard black ratio and the black ratio calculated by the black ratio calculating means. More specifically, letting y be the number of copies which can be outputted corresponding to the predetermined standard black ratio and Y be the black ratio calculated by the black ratio calculating means, the number of copies which can be outputted X corresponding to the defined capacity of the developer which is determined by the image forming apparatus is found on the basis of an equation $\{X = x \cdot (y/Y)\}$.

If it is desired to display the number of copies which can be outputted corresponding to the defined capacity of the developer which is determined by the image forming apparatus, a document which is thought to have a substantially average black ratio of the respective black ratios of images actually recorded by the image forming apparatus is prepared in the place where the image forming apparatus is located. If the image forming apparatus is a copying machine, for example, a document frequently used by a user is prepared. If the image forming apparatus is a facsimile, for example, a document sent by the facsimile is prepared. The prepared document is set in the reading means.

The image of the set document is read by the reading means. The black ratio is calculated on the basis of the output of the reading means. The number of copies which can be outputted corresponding to the defined capacity of the developer which is determined by the image forming apparatus is calculated on the basis of the calculated black ratio. The calculated number of copies which can be outputted is displayed.

According to the present invention, it is possible to inform a user of the image forming apparatus or a serviceman of the number of copies which can be outputted corresponding to the substantially average black ratio of the respective black ratios of the images actually recorded by the image forming apparatus. Consequently, the user or the serviceman can estimate the time when the developer is to be replenished more accurately.

The foregoing and other objects, features, aspects and advantages of the present invention will become more apparent from the following detailed description of the present invention when taken in conjunction with the accompanying drawings.

DESCRIPTION OF THE PREFERRED EMBODIMENT

Figure 1:
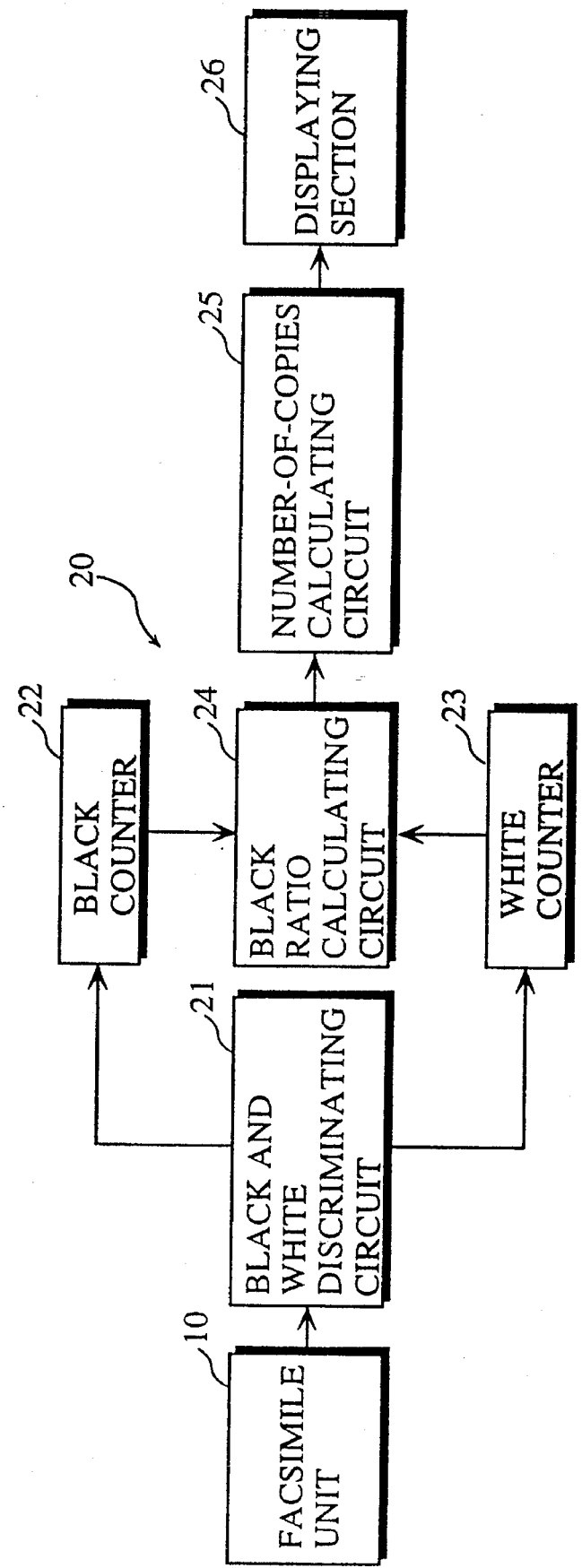
FIG. 1 is an electrical block diagram showing the construction of a facsimile.

An embodiment in a case where the present invention is applied to a facsimile will be described with reference to the drawings.

FIG. 1 illustrates a digital facsimile using an electrophotographic system.

The facsimile comprises a facsimile unit 10 having an ordinary facsimile function and a number-of-copies calculating and displaying unit 20 for calculating and displaying the number of copies which can be outputted in the facsimile unit 10.

The facsimile unit 10 comprises reading means for reading an image of a document, binary-coding means for binary-coding an image signal of the reading means, coding means for coding an output of the binary-coding means, transmitting means for modulating a code outputted from the coding means and transmitting the modulated code, receiving means for receiving a signal sent and demodulating the received signal, decoding means for decoding an output of the receiving means, and recording means for recording an output of the decoding means on paper, as is well-known.

The number-of-copies calculating and displaying unit 20 comprises a black and white discriminating circuit 21, a black counter 22, a white counter 23, a black ratio calculating circuit 24, a number-of-copies calculating circuit 25, and a display unit 26.

When it is desired to display the number of copies which can be outputted corresponding to the defined capacity of a developer which is determined by the facsimile, the operation mode is first switched from a normal operation mode to a number-of-copies calculation and display mode. A document which is thought to have an average black ratio of the respective black ratios of images of a document sent to a user of the facsimile is prepared. The prepared document is read by the reading means in the facsimile unit 10. In the number-of-copies calculation and display mode, the image signal read by the reading means is subjected to binary-coding processing in the binary-coding means, after which the image signal is sent to the black and white discriminating circuit 21.

The black and white discriminating circuit 21 outputs to the black counter 22 a signal for counting the black counter 22 up every time data representing a black pixel (for example, "1") is inputted from the binary-coding means in the facsimile unit 10, and outputs to the white counter 23 a signal for counting the white counter 23 up every time data representing a white pixel (for example, "0") is inputted from the binary-coding means.

A count value of the black counter 22 and a count value of the white counter 23 are sent to the black ratio calculating circuit 24. The black ratio calculating circuit 24 calculates the black ratio on the basis of the count values of both the counters 22 and 23. Specifically, the count value of the black counter 22 (the total number of data each representing a black pixel) is divided by the sum of the count values of both the counters 22 and 23 (the total number of data each representing a black pixel+the total number of data each representing a white pixel), thereby to calculate the black ratio.

The calculated black ratio is sent to the number-of-copies calculating circuit 25. In the number-of-copies calculating circuit 25, the number of copies which can be outputted X in the facsimile unit 10 is calculated on the basis of the following equation (1), for example. In the equation (1), Y is a black ratio [%] calculated by the black ratio calculating circuit 24. In addition, the equation (1) is an equation for calculating the number of copies which can be outputted X in a case where the number of copies which can be outputted corresponding to a standard black ratio of 6% is set to 3000.

$$X = 3000 \times (6/Y) \tag{1}$$

When the black ratio calculated by the black ratio calculating circuit 24 is 3%, for example, therefore, the number of copies which can be outputted X is 6000.

The number of copies which can be outputted, which is calculated by the number-of-copies calculating circuit 25, is displayed on the display unit 26. Consequently, a user of the facsimile and a serviceman can estimate the time when the developer is to be replenished on the basis of the displayed number of copies which can be outputted.

Although in the above described embodiment, description was made of a case where the present invention is applied to the facsimile, the present invention is also applicable to an image forming apparatus such as a copying machine or a printer.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image forming apparatus comprising:

recording means for recording an image on paper using a developer;

reading means for reading an image of a given document;

black ratio calculating means for calculating the black ratio of the image of said document on the basis of an output of said reading means;

number-of-copies calculating means for calculating a number of copies which can be outputted corresponding to a defined capacity of the developer which is determined by the image forming apparatus on the basis of the black ratio calculated by said black ratio calculating means; and displaying means for displaying the number of copies which can be outputted which is calculated by said number-of-copies calculating means.

2. The image forming apparatus according to claim 1, wherein the image of the document read by said reading means is a document image having an average black ratio of the respective black ratios of images formed by said image forming apparatus.

3. The image forming apparatus according to claim 1, wherein said black ratio calculating means comprises a first counter for counting the number of data each representing a black pixel on the basis of the output of said reading means, a second counter for counting the number of data each representing a white pixel on the basis of the output of said reading means, and means for calculating the black ratio by dividing the result of the counting by said first counter by the sum of the result of the counting by said first counter and the result of the counting by said second counter.

4. The image forming apparatus according to claim 3, wherein the image of the document read by said reading means is a document image having an average black ratio of the respective black ratios of images formed by said image forming apparatus.

5. An image forming apparatus comprising:

recording means for recording an image on paper using a developer;

reading means for reading an image of a given document;

black ratio calculating means for calculating the black ratio of the image of said document on the basis of an output of said reading means;

number-of-copies calculating means for calculating a number of copies which can be outputted corresponding to a defined capacity of the developer which is determined by the image forming apparatus on the basis of the black ratio calculated by said black ratio calculating means; and displaying means for displaying the number of copies which can be outputted which is calculated by said number-of-copies calculating means, wherein said number-of-copies calculating means calculates said number of copies which can be outputted on the basis of the number of copies which can be outputted corresponding to a predetermined standard black ratio and the black ratio calculated by said black ratio calculating means.

6. The image forming apparatus according to claim 5, wherein letting y be the predetermined standard black ratio, x be the number of copies which can be outputted corresponding to the predetermined standard black ratio and Y be the black ratio calculated by said black ratio calculating means, the number of copies which can be outputted X corresponding to the defined capacity of the developer which is determined by said image forming apparatus is found on the basis of an equation $\{X = x \cdot (y/Y)\}$.

7. The image forming apparatus according to claim 5, wherein the image of the document read by said reading means is a document image having an average black ratio of the respective black ratios of images formed by said image forming apparatus.

\* \* \* \* \*